United States Patent
Wax et al.

[11] Patent Number: 6,064,339
[45] Date of Patent: May 16, 2000

[54] SUBSPACE SIGNATURE MATCHING FOR LOCATION AMBIGUITY RESOLUTION IN WIRELESS COMMUNICATION SYSTEMS

[75] Inventors: Mati Wax; Yan Meng, both of San Ramon; Oliver Hilsenrath, Alamo, all of Calif.

[73] Assignee: US Wireless Corporation, San Ramon, Calif.

[21] Appl. No.: 09/137,640

[22] Filed: Aug. 20, 1998

Related U.S. Application Data

[63] Continuation-in-part of application No. 08/949,069, Oct. 10, 1997, abandoned, which is a continuation-in-part of application No. 08/780,565, Jan. 7, 1997.

[51] Int. Cl.[7] ........................................................ G01S 5/02
[52] U.S. Cl. ............................................. 342/417; 342/457
[58] Field of Search ..................................... 342/417, 452, 342/450, 457; 455/422, 456, 457

[56] References Cited

U.S. PATENT DOCUMENTS

| | | | |
|---|---|---|---|
| 4,728,959 | 3/1988 | Maloney et al. | 342/457 |
| 5,327,144 | 7/1994 | Stilp et al. | 342/387 |
| 5,420,910 | 5/1995 | Rudokas et al. | 379/59 |
| 5,512,908 | 4/1996 | Herrick | 342/387 |
| 5,570,412 | 10/1996 | LeBlanc | 379/58 |
| 5,634,199 | 5/1997 | Gerlach et al. | 455/63 |
| 5,724,660 | 3/1998 | Kauser et al. | 455/456 |

*Primary Examiner*—Thomas H. Tarcza
*Assistant Examiner*—Dao L. Phan
*Attorney, Agent, or Firm*—Lumen Intellectual Property Services

[57] ABSTRACT

A method and apparatus reduces the ambiguities in the determination of cellular telephone locations in a location finding system based on the use of multipath signals. A location finding base station determines a signal signature from a subspace of an array covariance matrix. The signature is compared to a database of calibrated signal signatures and corresponding locations, and a set of likely locations whose calibrated signatures best match the measured signature is selected. A subset of most likely locations is selected from among the likely locations by comparing a function which represents how closely the measured signature matches the set of calibrated signatures with functions which represent how closely each likely signature matches the set of calibrated signatures. The locations corresponding to the best matching function are selected.

10 Claims, 5 Drawing Sheets

SUBSPACE SIGNATURE MATCHING FOR LOCATION AMBIGUITY RESOLUTION IN WIRELESS COMMUNICATION SYSTEMS

This application is a continuation-in-part of U.S. patent application Ser. No. 08/949,069, filed Oct. 10, 1997, now abandoned, which is a continuation-in-part of U.S. patent application Ser. No. 08/780,565, filed Jan. 7, 1997, both of which are incorporated herein by reference.

FIELD OF THE INVENTION

This invention relates generally to methods for passively determining the location of a radio transmitter. More particularly, it relates to methods for reducing ambiguities in the determination of cellular telephone locations.

BACKGROUND OF THE INVENTION

In wireless radio communication systems, such as cellular telephone networks, it is generally recognized that there is a great need and utility for accurately determining in real time the location of mobile radio transmitters, such as cellular phone handsets. For example, U.S. Pat. No. 5,512,908 to Herrick mentions the application of cellular location information to 911 dispatching, tracking unauthorized cell phone usage, and tracking or locating commercial and/or government vehicles. U.S. Pat. No. 5,327,144 to Stilp et al. also mentions various applications of mobile location information, such as locating lost or stolen vehicles, assisting lost motorists, and dispatching emergency vehicles.

All of the above location-based services, however, fundamentally depend on the ability to obtain consistent and accurate location information in a wide range of environments. Although conventional techniques for location finding can provide location information in certain limited situations, they fail to provide accurate location information in many environments, particularly in urban environments where signal multipath is often severe. Urban environments, however, are the places where such services are often needed most.

In contrast to conventional techniques for location finding, Hilsenrath et al. in U.S. patent application Ser. No. 08/780,565 (which is not admitted to be prior art by its mention in this background discussion) disclose a unique method for location finding that performs especially well in multipath environments, and requires only a single base station. While conventional wisdom views multipath signals as noise to be reduced, ignored, or eliminated, the method of Hilsenrath et al. takes advantage of multipath signals to help identify transmitter locations. Because signal signatures are naturally associated with locations by virtue of the spatial dependence of multipath, the base station can use this fact to determine a location by matching a measured signature with a particular calibrated signature in a database of signatures and corresponding locations.

Due to noise and other uncertainties, however, it can be difficult to ensure a reliable and unique match between a measured signature and one of the calibrated signatures, and thus obtain accurate and unambiguous location information. There is a need, therefore, to provide techniques for reducing ambiguities in these location finding systems.

SUMMARY OF THE INVENTION

Accordingly, it is a primary object of the present invention to provide a method for improving the accuracy of location determinations, and reducing ambiguities in the likely locations of mobile radio transmitters. In particular, it is an object of the present invention to provide a method for resolution of ambiguities between similar signatures that does not require the measurement of additional signal information and does not require temporal tracking or multisite correlation techniques. It is a further object of the present invention to provide a technique for reducing ambiguities that is compatible with, and can supplement, temporal tracking and multisite correlation techniques.

In one aspect of the invention, a method is provided for selecting from a set of calibrated transmitter locations a set of most likely locations. The method comprises measuring at a base station a signal signature R and calculating a difference between a function $L_R$ and each function $L_{R_i}$ in a set of functions $L_{R_1}, \ldots, L_{R_N}$. The function $L_R$ represents how signature R compares to a set of calibrated signatures which corresponds to the set of calibrated locations, and the functions $L_{R_1}, \ldots, L_{R_N}$ represent how each signature $R_i$ in the set of calibrated signatures compares to the set of calibrated signatures. The set of most likely locations is calculated by selecting those locations $d_k$ such that the calculated difference between the functions $L_R$ and $L_{R_k}$, with respect to some predefined metric, is smaller than a predetermined threshold. A subset of the set of calibrated transmitter locations is then identified, where each location in the subset corresponds to a signature in the selected subset of most likely signatures.

In another aspect of the invention, a method is provided for selecting from a set of calibrated transmitter locations a set of most likely locations, by measuring at first and second base stations signal signatures R and R'. A difference between $L_R$ and each $L_{R_i}$ is calculated, as well as a difference between $L_R'$ and each $L_{R'_i}$, where the primed variables signify those of a second base station. The method further includes selecting a subset of most likely common signatures, such that, for each most likely signature $R_k$, and for each most likely signature $R'_k$, an arithmetic combination of the calculated difference between the function $L_R$ and $L_{R_k}$, and the calculated difference between the function $L_R$ and $L_{R_k}$ is smaller than a predetermined threshold. A subset of the set of calibrated transmitter locations is then identified, where each location in the subset corresponds to a signature in the selected subset of most likely signatures.

DETAILED DESCRIPTION

Although the present detailed description contains many specifics for the purposes of illustration, anyone of ordinary skill in the art will appreciate that many variations and alterations to the details are within the scope of the invention. Accordingly, the following embodiments of the invention are set forth without any loss of generality to, and without imposing limitations upon, the claimed invention.

Figure 1:
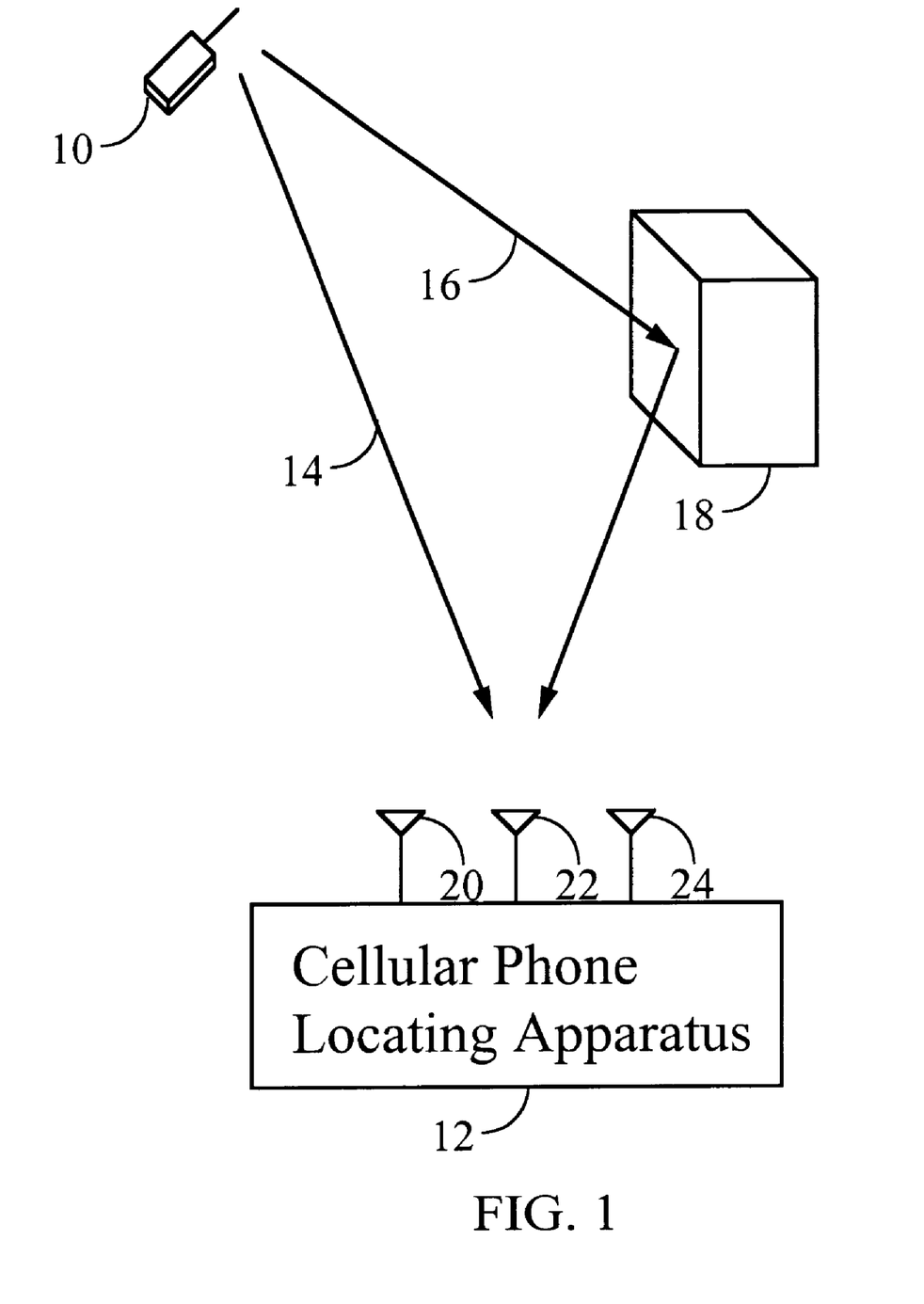
FIG. 1 illustrates a wireless communication system according to the present invention.

In a communication system according to a preferred embodiment of the invention, a cellular telephone 10 transmits a signal which travels through an environment and couples to an array of antennas 20, 22, 24 of a cellular telephone location finding apparatus 12, as shown in FIG. 1. Typically, in addition to a direct path signal 14 from phone 10 to apparatus 12, there may be additional multipath signals reflected from various environmental objects, for example, multipath signal 16 reflected from object 18. In addition, there are typically various smaller local scatterers (not shown) positioned within a region around phone 10. Consequently, signals 14 and 16 may comprise components corresponding to these scattered signals.

Figure 2:
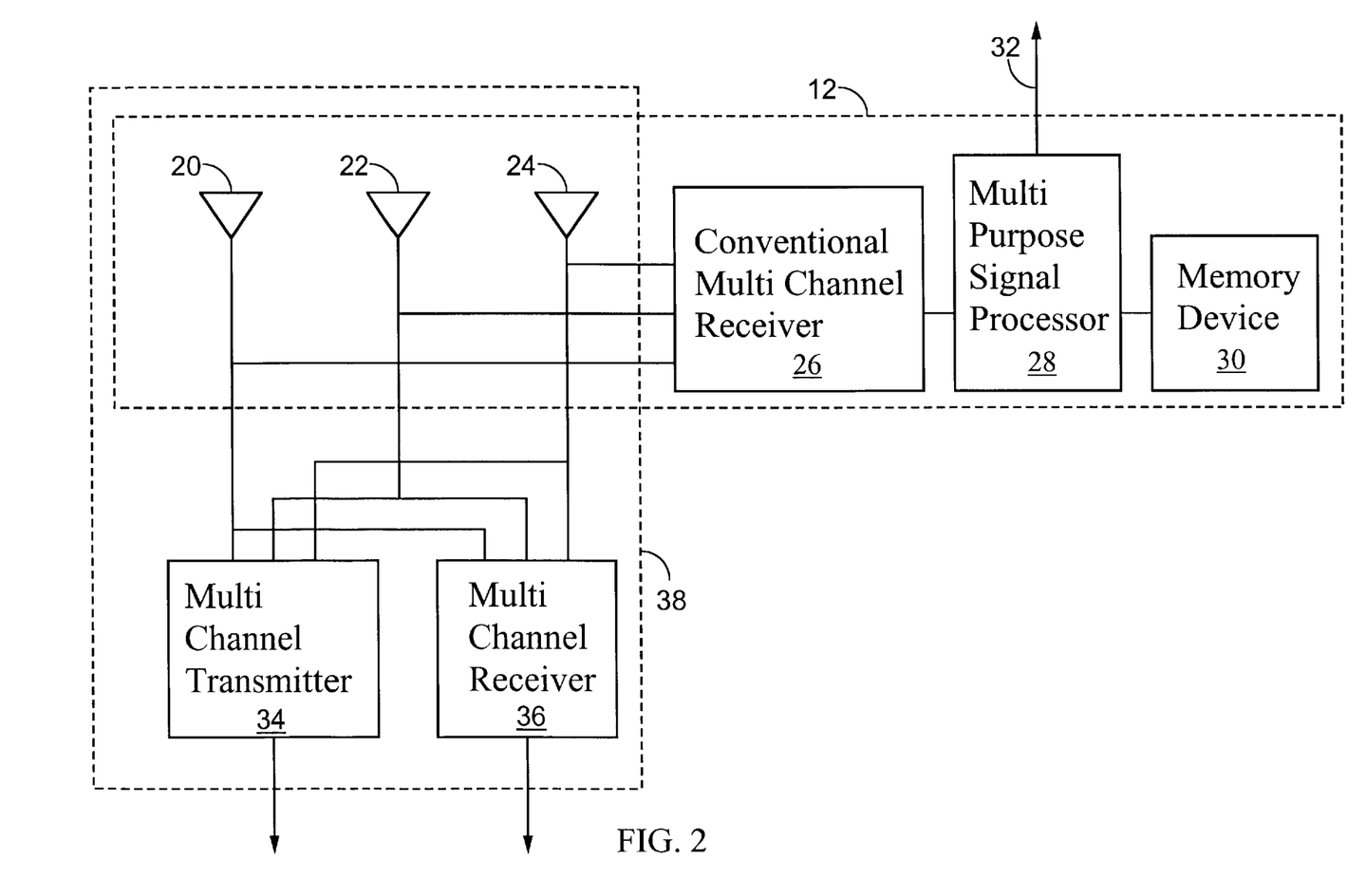
FIG. 2 is a block diagram of an apparatus of the present invention in combination with an existing cellular base station.

As shown in FIG. 2, a location finding apparatus 12 includes a conventional multichannel receiver 26 which receives signals from the antennas 20, 22, 24. The received signals are sent to multi-purpose signal processor 28 which performs signal signature identification, database searching, and other required processing as will be described in detail below. A memory device 30 is accessible by processor 28 and is used to store signal signature calibration data, location data, geographical map data, and/or other data as required. Location information determined by processor 28 is sent over external communication lines 32 for use by other systems, as will be described in more detail below in relation to FIG. 6. In the present embodiment, location finding apparatus 12 shares antennas with an existing cellular telephone base station 38, which has multi-channel receivers 34 and multi-channel transmitters 36, among other components well-known in the art (not shown). Note, however, that location finding apparatus 12 need not be connected to a cellular base station 38, but can operate as a stand-alone device with its own antennas.

In general, the apparatus 12 has a number p of antennas forming an array. For illustrative purposes, however, the array is shown in the figures as having three antennas 20, 22, and 24. In the preferred embodiment, which corresponds to most typical situations, p=6. The p antennas are used to receive complex signal envelopes $x_1(t), x_2(t), \ldots, x_p(t)$, respectively, which are conventionally grouped together to form a p-dimensional array vector $x(t)=[x_1(t), x_2(t), \ldots, x_p(t)]^T$. In general, the dimension of the array vector $x(t)$ is equal to p, the number of antennas in the array.

In a preferred embodiment, a batch of array vectors is sampled during a sampling time interval, and the outer products of these vectors are combined to form a $p \times p$ covariance matrix for the batch. Typically, about 100 array vectors are sampled in a 1 ms interval (one array vector per ten microseconds).

Because each batch spans 1 ms, there is sufficient time using this technique to sample up to 50 different channels in a 50 ms interval. Consequently, although the present description is focused upon the processing of one signal, in the preferred embodiment, the techniques described herein can be applied in parallel to signals on up to 50 channels. In addition, it will be recognized by those skilled in the art that although this sampling procedure is appropriate for the AMPS cellular standard it can be adapted to various other modulation schemes as well. In the case of a CDMA cellular network, for example, spread spectrum signals from the antenna array are digitized and passed through synchronized multichannel despreaders to produce the p-dimensional array vectors $x(t)$ corresponding to each mobile. These vectors can then be sampled and used to form a covariance matrix for each batch in the manner outlined above.

For a given mobile, the collection of the covariance matrices for the 100 batches are averaged to form a $p \times p$ signal covariance matrix, R, which is normalized such that Tr R=1. This normalized covariance matrix is used as the basis for subsequent calculations, as will be described below.

In one technique, the location of a mobile is determined from its covariance matrix R through the use of a database containing N calibrated signal signatures and associated locations, as shown in TABLE 1.

TABLE 1

| Location | Signal Signature | | |
|---|---|---|---|
| (x, y, z) | Subspace | Time Delays | Covariance |
| $d_1$ | $U_1$ | $\tau_1$ | $R_1$ |
| . | . | . | . |
| . | . | . | . |
| . | . | . | . |
| $d_N$ | $U_N$ | $\tau_N$ | $R_N$ |

The locations $d_1, \ldots, d_N$ may be two or three dimensional, and each may be assigned a date upon which it was last calibrated. Each location $d_i$ has an associated signal signature that characterizes the structure of the signal from that location. This signal signature may include information such as a signal subspace $U_i$, a set of differential time delays $\tau_i$, and a calibrated covariance matrix $R_i$.

This database may be generated by various techniques. For example, it may be generated by an empirical calibration procedure, as follows. A cellular phone and a global positioning system (GPS) receiver are placed in a vehicle which moves to various locations in a geographical region of interest. The GPS data are periodically stored and time-stamped using the GPS clock. Meanwhile, the transmitted signal from the cellular phone is received at the base station, which is also equipped with a GPS receiver, and the signal covariance matrix R is also time stamped with the GPS clock and stored. When the mobile returns, the stored data is post-processed using differential GPS correction data obtained from the base station to determine with high accuracy the location corresponding to each covariance matrix R. This data is then used to construct the calibration table database.

The signal subspace $U_i$ for a location is determined from the dominant eigenvectors of $R_i$. The dominant eigenvectors are defined as the eigenvectors of $R_i$ corresponding to the largest eigenvalues that collectively capture at least certain amount, e.g. 90%, of the total signal energy. It should be emphasized that the signal subspace may be determined by various different criteria as well.

In one approach to location finding, the location of a mobile phone in the service area may be determined in real time as follows. Signals originating from a phone 10 at an unknown location are received at the base station 12 by multichannel receiver 26. The signal processor 28 at the base station then determines the signal covariance matrix R as described in detail above. The covariance matrix R is then compared with the set of N calibrated signal subspaces $\mathcal{U}\{U_1, \ldots, U_N\}$ which are stored along with the associated set of N known locations $\mathcal{D}=\{d_1, \ldots, d_N\}$ in the calibration database. The measure of similarity between covariance matrix R and a given calibrated signature $U_i$ may be determined by evaluating a function that measures the degree to which the measured signal covariance R coincides with the $i^{th}$ calibrated subspace $U_i$. For example, define the function $L_R$ at a location index i to be the weighted mean of the square of the cosines of the principle angles between the subspace $U_i$ and R, where the weights are given by the eigenvalues of R. In other words, $$L_R(i) = Tr\{P_i R\} = Tr\{U_i U_i^H R\},$$

where $P_i = U_i U_i^H$ is the projector onto the subspace $U_i$ and $U_i^H$ is the Hermitian conjugate of $U_i$. The value of $L_R(i)$ represents the likelihood that the mobile is at or near calibrated location $d_i$. It will be appreciated that this function can be defined in many other ways to measure how closely the signal covariance resembles any given calibrated signature. For example, $L_R(i)$ can be defined to be the mean of the squares of the cosines of the principal angles between the subspaces U and $U_i$, where U is the subspace corresponding to R. In other words, $$L_R(i) = \frac{1}{m}\|UU^H U_i\|^2,$$

where m=min{dim U, dim $U_i$} and $\|\cdot\|$ is the Frobinius norm defined by $\|A\|^2 = Tr(AA^H)$. Note that $UU^H$ can be computed just once and the result may be used to evaluate $L_R(i)$ for any i.

Figure 3A:
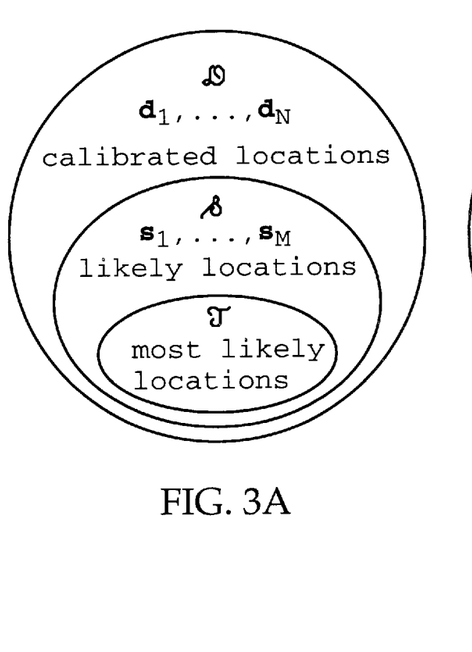
FIG. 3A is a schematic diagram of the relationship between the set $\mathcal{D}$ of calibrated locations, the set $\delta$ of likely locations, and the set $\mathcal{T}$ of most likely locations.
Figure 3B:
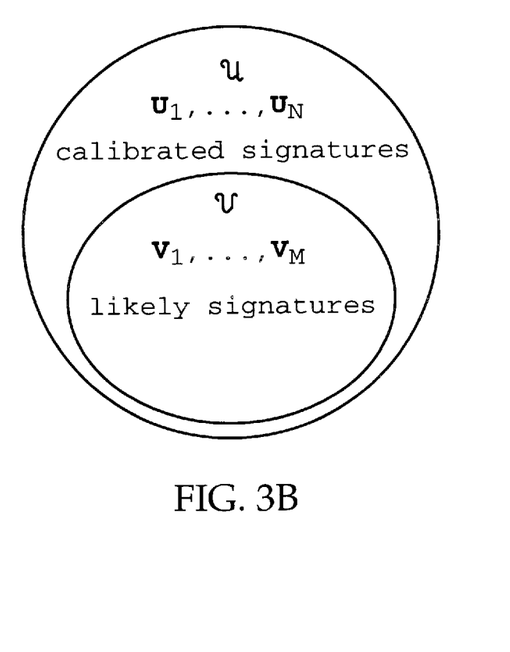
FIG. 3B is a schematic diagram of the relationship between the set $\mathcal{U}$ of calibrated signatures and the sets $\mathcal{V}$ of likely signatures.
Figure 4:
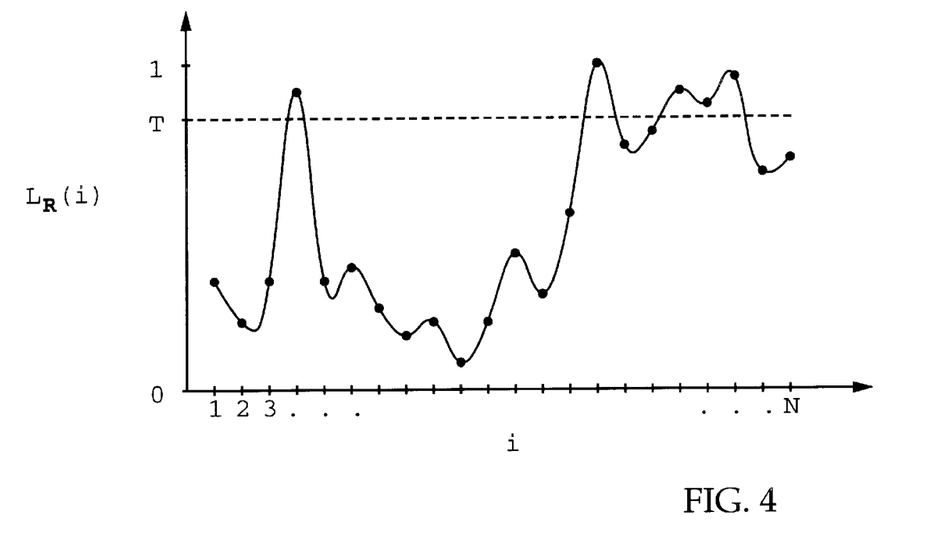
FIG. 4 is a graph of the measure of similarity vs. calibrated signature for a measured signature R.

By calculating the value of $L_R(i)$ for all N locations, a set $\mathcal{S}$ of likely locations can be selected from among the locations in $\mathcal{D}$ by taking, for example, those locations $d_i$ such that $L_R(i)$ is greater than a certain predetermined threshold value T, as shown in FIG. 4. The actual location of the phone will be one of these likely locations, indicated in the figure as points above the dashed line. Alternatively, the set of likely locations can be selected by taking a predetermined number (e.g., ten) of locations $d_i$ such that $L_R(i)$ is largest. Other similar criteria for selecting likely locations can be used as well. Note that this set $\mathcal{S}=\{S_1, \ldots, S_M\}$ of likely locations corresponds to a set $\mathcal{V}=\{V_1, \ldots, V_M\}$ of likely calibrated signatures. FIGS. 3A and 3B illustrate the relationships between these sets.

Alternatively, or in addition to the above method, other methods of determining likely locations may be used as well. For example, a set of N functions $L_{R_1}(i), \ldots, L_{R_N}(i)$ can be calculated, where $L_{R_j}(i)$ is defined just as $L_R(i)$ was defined above, but with $R_j$ in place of R.

Figure 5:
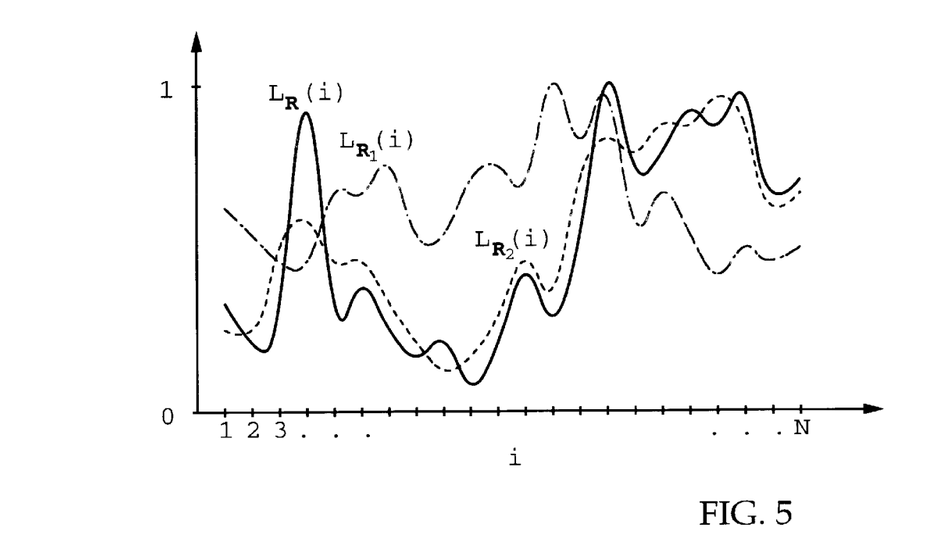
FIG. 5 is a graph of the measure of similarity vs. calibrated signature for a measured signature R, as well as for likely signatures $R_1$ and $R_2$.

FIG. 5 shows graphs of two possible functions $L_{R_1}$ and $L_{R_2}$ (dashed) superimposed on the graph of $L_R$ (solid). Observe that when the function $L_R$ is compared with each of the functions $L_{R_1}, \ldots, L_{R_M}$, the actual location ideally should be that location which corresponds to the function that is closest, in some statistical metric G, to $L_R$.

Then the actual location should be the location $d_k$ for which G(k) is the smallest. Those skilled in the art will appreciate that many other measures of statistical similarity between functions can also be used to determine the similarity of functions to achieve the same result.

Likely locations can then be selected by measuring the degree of similarity between $L_R(i)$ and each of the functions $L_{R_1}(i), \ldots, L_{R_N}(i)$. For example, let $$G(k) = \sum_{i=1}^{N} |L_R(i) - L_{R_k}(i)|^2.$$

Alternatively, G(k) can be defined by the Kullback-Liebler distance, $$G(k) = \sum_{i=1}^{N} \tilde{L}_R(i)\ln\tilde{L}_R(i)/\tilde{L}_{R_k}(i),$$

where $$\tilde{L}_R(i) = \frac{L_R(i)}{\sum_{j=1}^{N} L_R(j)}$$

and $$\tilde{L}_{R_k}(i) = \frac{L_{R_k}(i)}{\sum_{j=1}^{N} L_{R_k}(j)}.$$

Then a set of most likely locations can be selected by finding those locations $d_k$ such that G(k) is greater than a certain predetermined threshold value T'.

The above technique reduces location ambiguity because the function $L_R$ is compared to the functions $L_{R_k}$ over their entire domains rather than just at single points. Thus, more information is used to compare the measured signature with the calibrated signatures, and a more accurate match can be obtained.

This technique may be used to select from the set $\mathcal{S}$ of likely locations a smaller set of most likely locations $\mathcal{T} \subset \mathcal{S}$ (See FIG. 3A.) The set $\mathcal{T}$ can be defined as the locations in $\mathcal{S}$ whose corresponding functions $L_{R_k}$ are closest to $L_R$ in the sense of G. Alternatively, $\mathcal{T}$ can be defined as those locations in $\mathcal{S}$ whose corresponding functions $L_{R_k}$ are within a certain predetermined distance H (in the sense of G) to $L_R$. That is, $$\mathcal{T} = \{s_k \in \mathcal{S}: G(k) < H\}.$$

By appropriate adjustment of the constants T and H in dependence upon the degree of tolerance desired and the amount of noise present in a particular system, the set $\mathcal{T}$ should contain one or more locations that have a high probability of being the actual location of the transmitter.

Figure 6:
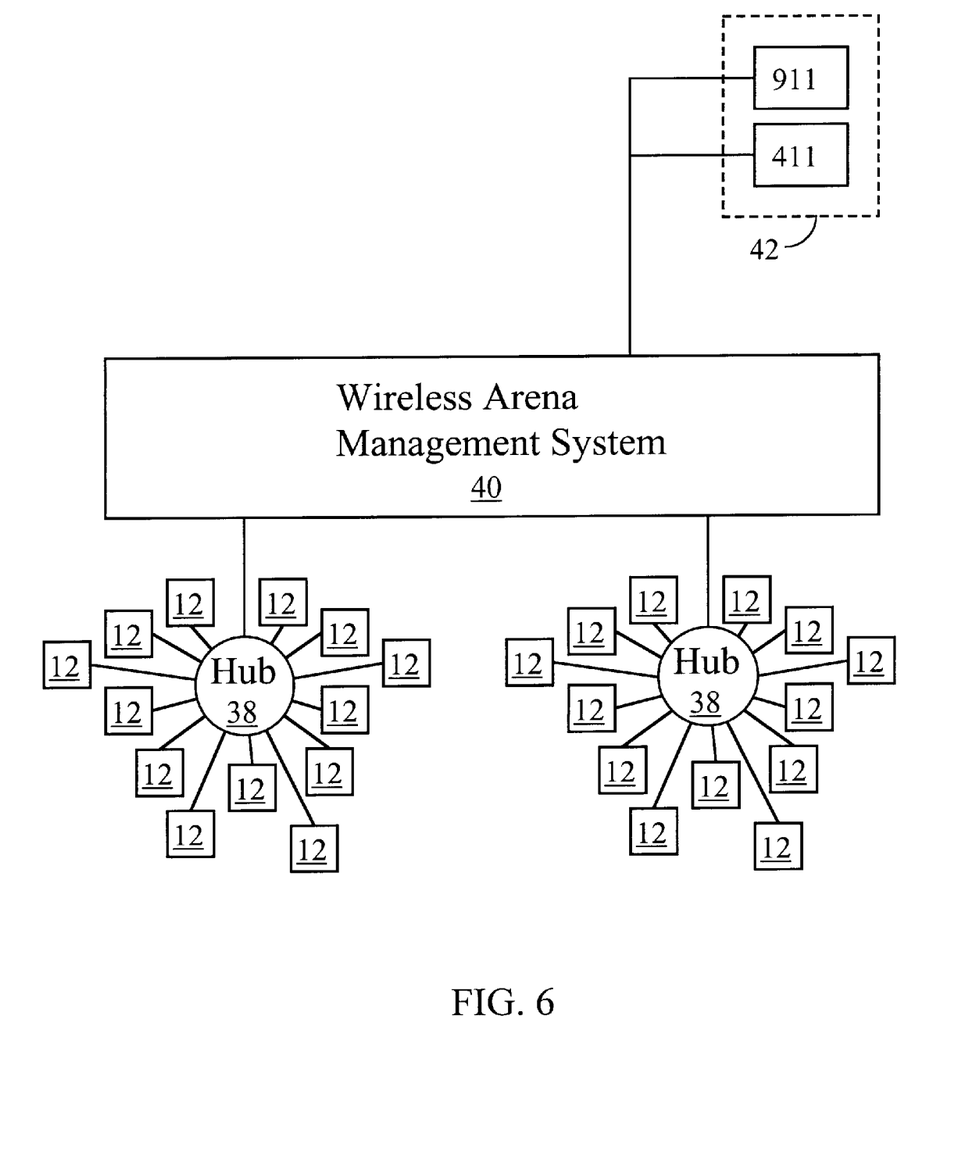
FIG. 6 is a schematic diagram of a cellular network management system according to the present invention.

If the set $\mathcal{T}$ contains more than one location, then additional techniques can be used to further reduce ambiguity. In particular, note that this technique can be used in the situation where information from multiple bases is available to provide additional ambiguity reduction. An example of such a system is shown in FIG. 6. Individual base stations 12 are connected to metropolitan hubs 38, which collect and coordinate location information for cellular phones in different metropolitan areas.

To reduce ambiguity in such a system, signatures R and R' from a single phone are measured at a first and second base station, respectively, and these signatures are sent every few seconds to their common hub 38 where the signatures are compared to calibrated signatures $\mathcal{U}=\{U_1, \ldots, U_N\}$ and $\mathcal{U}=\{U'_1, \ldots, U'_N\}$ to obtain functions $L_R$ and $L'_R$, from which likely locations $\mathcal{S}=\{s_1, \ldots, s_M\}$ and $\mathcal{S}'=\{s'_1, \ldots, s'_M\}$ are determined, just as before. These likely locations are determined independently.

Then, rather than determining subsets $\mathcal{T}$ and $\mathcal{T}'$ independently, the likely signature information from both base stations is combined to provide additional ambiguity reduction, as follows.

Figure 3C:
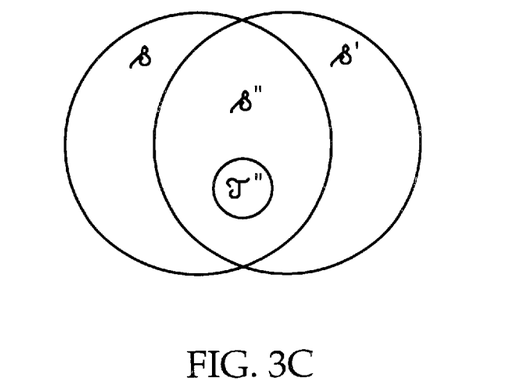
FIG. 3C is a schematic diagram of the relationship between the sets $\delta$ and $\delta'$ of likely locations determined from two different base stations, the set $\delta''$ of their likely common locations, and a subset $\mathcal{T}''$ of most likely common locations.

Because the actual location must be common to both base stations, we need only consider the set $\delta''=\{s''_1, \ldots, s''_K\}$ of those locations common to both $\delta$ and $\delta'$, i.e. let $\delta''=\delta \cap \delta'$. If there is more than one location in $\delta''$ then we can select from the set $\delta''$ of likely common locations a smaller set of most likely common locations $\mathcal{T}'' \subset \delta''$. (See FIG. 3C.) The set $\mathcal{T}''$ can be defined in various ways, such as $$\mathcal{T}'' = \{s''_k \in \mathcal{S}'' : G(k) + G'(k) < g\},$$

where g is a predetermined constant, and G'(k) is defined just as G(k), except with reference to $\mathcal{U}'=\{U'_1, \ldots, U'_N\}$, rather than to $\mathcal{U}=\{U_1, \ldots, U_N\}$. It will be appreciated that various alternate criteria can be used to define the set of most likely locations by making use of the functions G and G'. Because this technique simultaneously compares the function $L_R$ to both the calibrated functions $L_{R_k}$ and $L_{R'_k}$, it provides a higher degree of ambiguity reduction than the technique of comparing $L_R$ to each of $L_{R_k}$ and $L_{R'_k}$ independently. It will be appreciated by those skilled in the art that this technique generalizes in a straightforward way to three or more base stations.

The accurate and reliable location information provided by the present invention can be used for many important applications. For example, location information can be sent by the cellular operator to third party service providers 42 for various uses. For example, it can be used in conjunction with 911 calls to provide dispatchers with immediate locations for callers under emergency circumstances. Location information also can be used for enhanced 411 service, i.e. for real time caller location associated services, such as providing directions to lost motorists. The location information can be sent to an automatic road toll management system or used for smart vehicular scheduling on a highway network. For example, the present invention may be used to provide enhanced 911 response of emergency vehicles by tracking the locations of emergency vehicles, coordinating location information with street map databases, and communicating specific optimal directions to appropriate vehicles. Such an enhanced 911 service is an important advantage of the present invention. Location information also can be used for remote monitoring of health conditions of patients, for remote control and/or navigation of robot devices, and for numerous other such special purpose applications.

The foregoing important applications, as well as many others, can be integrated into a wireless arena management (WAM) system, shown in FIG. 6, which makes use of location information determined by individual base stations 12 and/or hubs 38 to manage metro networks individually and collectively. For example, location information sent from individual base station sites 12 to metro hubs 38 can be used to assist in hand-off between cells, for automatic trunking, for channel borrowing, for channel capacity optimization, to more efficiently allocate cellular frequencies, and to increase the capacity of the metro network. On a global level, a WAM hub 40 links the metro hubs 38 and provide access to third party service centers 42, for example, appropriate regional 911 and 411 service centers. It is a significant feature of the present invention that high bandwidth communication lines are not required to determine and communicate location information within such a network. Accordingly, the present invention enables for the first time the ability to use location information to actively monitor and/or manage all the wireless traffic in a network.

It should be noted that the present technique is applicable to other techniques for matching a measured value to a collection of possible values. For example, the present technique is easily adapted for use in reducing ambiguity in direction finding (DF) based techniques for location determination. It may also be adapted to various other analogous pattern recognition problems. In addition, it should be noted that the foregoing details may be varied in many ways without departing from the general spirit and scope of the invention. Accordingly, the scope of the present invention should be determined from the following claims and their legal equivalents.

What is claimed is:

1. In a system for wireless transmitter location finding, a method for selecting from a set of calibrated transmitter locations a set of most likely locations, the method comprising:

measuring at a base station a transmitter signal signature R;

calculating a difference between a function $L_R$ and each function $L_{R_i}$ in a set of functions $L_{R_1}, \ldots, L_{R_M}$, where the function $L_R$ represents how signature R compares to a set of calibrated signatures which corresponds to the set of calibrated locations, and where the functions $L_{R_1}, \ldots, L_{R_M}$ represent how each signature in a set of M calibrated signatures compares to the set of calibrated signatures;

selecting a set of most likely signatures, such that, for each most likely signature $R_k$, the calculated difference between the function $L_R$ and $L_{R_k}$ is smaller than a predetermined threshold; and identifying a subset of the set of calibrated transmitter locations, wherein each location in the subset corresponds to a signature in the selected subset of most likely signatures.

2. The method of claim 1 wherein the function $L_R$ evaluated at a calibrated location i is a function of the cosines of the principle angles between a transmitter signature R and a calibrated signature $U_i$.

3. The method of claim 1 wherein the function $L_R$ evaluated at a calibrated location i is a trace of a projection of R onto a subspace spanned by a calibrated signature $U_i$.

4. The method of claim 1 wherein the difference between the function $L_R$ and each function $L_{R_i}$ is calculated by calculating a sum of squared distances between $L_R$ and $L_{R_i}$.

5. The method of claim 1 wherein the difference between the function $L_R$ and each function $L_{R_i}$ is calculated by calculating the Kullback-Liebler distance between $L_R$ and $L_{R_i}$.

6. In a system for wireless transmitter location finding, a method for selecting from a set of calibrated transmitter locations a set of most likely locations, the method comprising:

measuring at a first base station a transmitter signal signature R;

measuring at a second base station a transmitter signal signature R';

calculating a difference between a function $L_R$ and each function $L_{R_i}$ in a set of functions $L_{R_1}, \ldots, L_{R_M}$, where the function $L_R$ represents how signature R compares to a set of first base station calibrated signatures which corresponds to the set of calibrated locations, and where the functions $L_{R_1}, \ldots, L_{R_M}$ represent how each signature in a set of likely first calibrated signatures compares to the set of calibrated signatures;

calculating a difference between a function $L_{R'}$ and each function $L_{R'_i}$ in a set of functions $L_{R'_1}, \ldots, L_{R'_M}$, where the function $L_{R'}$ represents how signature R' compares to a set of second base station calibrated signatures which corresponds to the set of calibrated locations, and where the functions $L_{R'_1}, \ldots, L_{R'_M}$ represent how each signature in a set of likely second calibrated signatures compares to the set of second calibrated signatures;

selecting from the sets of first and second likely signatures a subset of most likely common signatures, such that, for each most likely signature $R_k$, and for each most likely signature $R'_k$, an arithmetic combination of the calculated difference between the functions $L_R$ and $L_{R_k}$, and the calculated difference between the function $L_{R'}$ and $L_{R'_k}$, is smaller than a predetermined threshold; and identifying a subset of the set of calibrated transmitter locations, wherein each location in the subset corresponds to a signature in the selected subset of most likely signatures.

7. The method of claim 6 wherein the function $L_R$ evaluated at a calibrated location i is a function of the cosines of the principle angles between the transmitter signature R and a calibrated signature $U_i$.

8. The method of claim 6 wherein the function $L_R$ evaluated at a calibrated location i is a trace of a projection of R onto a subspace spanned by a calibrated signature $U_i$.

9. The method of claim 6 wherein the difference between the function $L_R$ and each function $L_{R_i}$ is calculated by calculating a sum of squared distances between $L_R$ and $L_{R_i}$.

10. The method of claim 6 wherein the difference between the function $L_R$ and each function $L_{R_i}$ is calculated by calculating the Kullback-Liebler distance between $L_R$ and $L_{R_i}$.

* * * * *